United States Patent
Manolov et al.

(10) Patent No.: US 9,503,447 B2
(45) Date of Patent: Nov. 22, 2016

(54) SECURE COMMUNICATION BETWEEN PROCESSES IN CLOUD

(71) Applicants: Svetoslav Manolov, Sofia (BG); Diyan Yordanov, Sofia (BG); Petio Petev, Sofia (BG); Bojidar Kadrev, Sofia (BG)

(72) Inventors: Svetoslav Manolov, Sofia (BG); Diyan Yordanov, Sofia (BG); Petio Petev, Sofia (BG); Bojidar Kadrev, Sofia (BG)

(73) Assignee: SAP SE, Walldorf (DE)

( * ) Notice: Subject to any disclaimer, the term of this patent is extended or adjusted under 35 U.S.C. 154(b) by 490 days.

(21) Appl. No.: 14/168,026

(22) Filed: Jan. 30, 2014

(65) Prior Publication Data

US 2015/0215308 A1    Jul. 30, 2015

(51) Int. Cl.
| G06F 15/16 | (2006.01) |
| H04L 29/06 | (2006.01) |
| H04L 29/08 | (2006.01) |
| G06F 9/54  | (2006.01) |

(52) U.S. Cl.
CPC ............ *H04L 63/0823* (2013.01); *G06F 9/54* (2013.01); *H04L 63/168* (2013.01); *H04L 67/02* (2013.01); *H04L 67/10* (2013.01); *H04L 67/1031* (2013.01); *H04L 67/1036* (2013.01); *H04L 67/42* (2013.01)

(58) Field of Classification Search
CPC . H04L 63/0823; H04L 63/168; H04L 67/02; H04L 67/10; H04L 67/1031; H04L 67/1036; H04L 67/42; G06F 9/54
See application file for complete search history.

(56) References Cited

U.S. PATENT DOCUMENTS

| 6,874,084 | B1 | 3/2005 | Dobner et al. |
| 7,467,303 | B2 | 12/2008 | Keohane et al. |
| 8,086,846 | B2 | 12/2011 | Brabson |
| 8,095,658 | B2 | 1/2012 | Ashley et al. |
| 8,380,989 | B2 | 2/2013 | Sarmah et al. |
| 8,479,263 | B1 | 7/2013 | Liu et al. |
| 2003/0217005 | A1* | 11/2003 | Drummond ............ G06F 3/023 705/43 |
| 2005/0033964 | A1 | 2/2005 | Albanese et al. |
| 2005/0262357 | A1 | 11/2005 | Araujo et al. |
| 2006/0225132 | A1 | 10/2006 | Swift et al. |
| 2008/0216168 | A1 | 9/2008 | Larson et al. |
| 2008/0295112 | A1 | 11/2008 | Muscarella et al. |
| 2009/0271613 | A1 | 10/2009 | Brabson |
| 2010/0231454 | A1 | 9/2010 | Jenkins et al. |
| 2010/0235627 | A1 | 9/2010 | Kerschbaum et al. |
| 2010/0325420 | A1* | 12/2010 | Kanekar ............ H04L 63/0823 713/151 |
| 2012/0042216 | A1 | 2/2012 | Blubaugh |
| 2012/0260330 | A1 | 10/2012 | Zlatarev et al. |
| 2012/0265976 | A1 | 10/2012 | Spiers et al. |
| 2013/0246589 | A1 | 9/2013 | Klemba et al. |
| 2013/0268643 | A1 | 10/2013 | Chang et al. |

(Continued)

*Primary Examiner* — Jonathan Bui

(57) ABSTRACT

Secure communication between processes in cloud platform may be performed by receiving a request from a client application process hosted in an application virtual machine at a load balancer. A first secure communication channel is established between the client application process and the load balancer. The first secure communication channel is encrypted with the client certificate. The first secure communication channel is terminated at the load balancer. A service process in a service virtual machine is identified based on the request received from the client application process. A new request is sent to the service virtual machine to establish a second secure communication channel between the load balancer and the service virtual machine. The load balancer certificate signed by the internal certificate authority is validated at the service virtual machine. Upon successful validation of the load balancer certificate, the second secure communication channel is accepted at the service virtual machine.

20 Claims, 7 Drawing Sheets

(56) References Cited

U.S. PATENT DOCUMENTS

| | | |
|---|---|---|
| 2013/0297514 A1 | 11/2013 | Giobbi et al. |
| 2013/0311607 A1 | 11/2013 | Larson at al. |
| 2013/0312065 A1 | 11/2013 | Abeyweera et al. |
| 2013/0326346 A1 | 12/2013 | Zhu et al. |
| 2013/0333018 A1 | 12/2013 | Doukhvalov et al. |
| 2013/0346648 A1 | 12/2013 | Nimura et al. |
| 2014/0020072 A1* | 1/2014 | Thomas .............. H04L 63/0815 726/7 |
| 2014/0025572 A1 | 1/2014 | Krajec et al. |
| 2014/0025945 A1 | 1/2014 | McGrew et al. |

* cited by examiner

SECURE COMMUNICATION BETWEEN PROCESSES IN CLOUD

BACKGROUND

Some enterprises offer cloud services where computing resources such as servers, storage and applications are shared and delivered through the internet. These computing resources such as servers, storage and applications remain as virtual resources to end users. Based on a user request, a communication channel is established to a cloud platform, where computing resources may be provisioned to a user dynamically or on the fly. Typically, such communication channels are established via proxies and/or load balancers which reside in the cloud platform. Based on the user request, communication channels may be established between processes via load balancers. In such a scenario, dual authentication of the communicating parties is challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Figure 1:
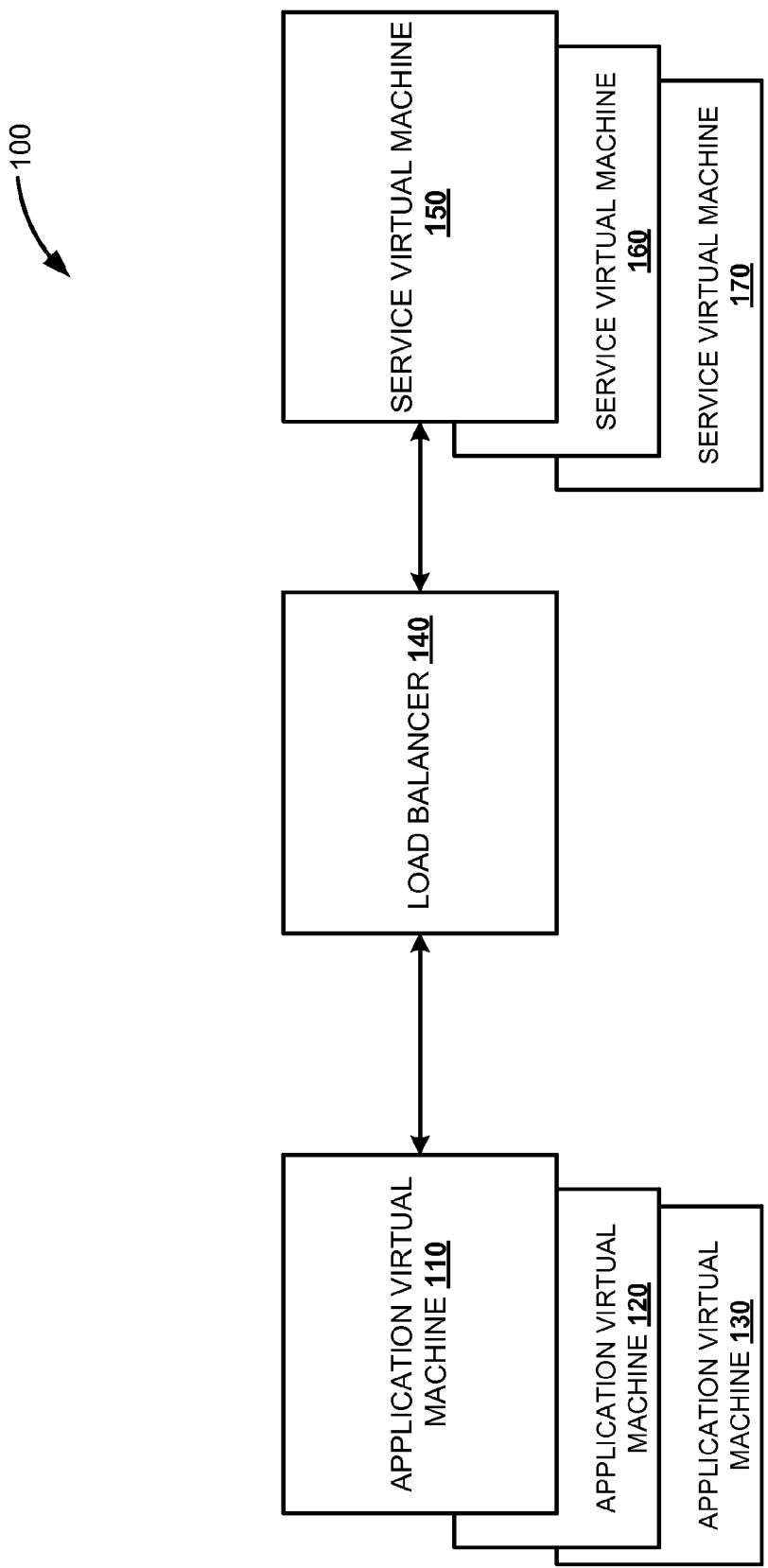
FIG. 1 is a block diagram illustrating an example environment for secure communication between processes in a cloud platform, according to one embodiment.

Embodiments of techniques for secure communication between processes in cloud are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Cloud computing refers to applications and services offered over the Internet. The term "cloud" in cloud computing can be defined as the set of hardware, networks, storage, services and interfaces that combine to deliver aspects of computing as a service. Enterprises offering cloud computing solutions offer their services in various types of models such as infrastructure as a service (IaaS), platform as a service (Paas), software as a service (SaaS), etc. By way of example, consider a platform as a service, which provides application runtime environment and a set of platform specific services. In PaaS, developers can deploy and use application processes in a cloud environment. PaaS offers tools, infrastructure and services for developers to collaborate and build application processes in the cloud environment. In one embodiment, the computing resources in the cloud environment are virtualized and provided as services to end users. Virtualization is the enabling technology for the cloud environment, where the physical infrastructure is made available as a software. Virtualization refers to creation of application virtual machines, where application virtual machines are software implementations of the underlying physical infrastructure such as computing resources that executes applications.

In one embodiment, a central cloud component named orchestrator is responsible for managing the lifecycle of the application virtual machines in a cloud platform. Based on a request from a client, an application virtual machine may be provisioned in the cloud platform to host an application process. The orchestrator generates and provisions a client certificate such as "X.509 certificate" for this application virtual machine. A client certificate, also referred to as a digital certificate or identity certificate, is an electronic document that uses digital signature and cryptographic keys to identify an entity such as person, application, host, etc., holding the client certificate. The client certificate can be used to verify the identity of the entity and establish a secure communication. The client certificate may be signed by a trusted certificate authority such as internal certificate authority. The internal certificate authority may act like a trusted third party that issues digital certificates. The generated client certificate includes virtual machine attributes such as a host name, an account name, an application name, permission flags, tenant identifiers, etc.

FIG. 1 is a block diagram illustrating example environment 100 for secure communication between processes in a cloud platform, according to one embodiment. The environment 100 as shown contains application virtual machines 110, 120 and 130, load balancer 140 and service virtual machines 150, 160 and 170. Merely for illustration, only representative number and types of systems are shown in FIG. 1. Other environments may contain many more virtual machines, both in number and type, depending on the purpose for which the environment is designed.

Based on an end user request, an application virtual machine may be provisioned in a cloud platform to host a client application process. Application virtual machine 110 may be provisioned to host and run the client application process (not shown). In the cloud platform, the requests to and from the application virtual machine 110 are directed via proxies or load balancers. The client application process may request service process from a service virtual machine. A secure communication channel may be established between the application virtual machine 110 and load balancer 140. Load balancers are devices and/or applications that distribute network or application traffic across a number of servers in the cloud platform. Load balancers improve the overall performance by managing and maintaining application specific tasks. Load balancers register entry points for applications and distribute incoming requests across the executing applications.

Based on application virtual machine attributes (not shown) such as a host name, an account name, an application name, permission flags, tenant identifiers, etc., the load balancer 140 identifies a service process and communicates with service virtual machine 150 associated with the service process. Service processes execute in the service virtual machines 150-170 in the server systems in the cloud platform. The service virtual machine 150 accepts request from the application virtual machine 110 by establishing a secure communication channel between the application virtual machine 110 and the service virtual machine 150. The service process executing in the service virtual machine 150 provides the service requested by the application virtual machine 110.

Figure 2:
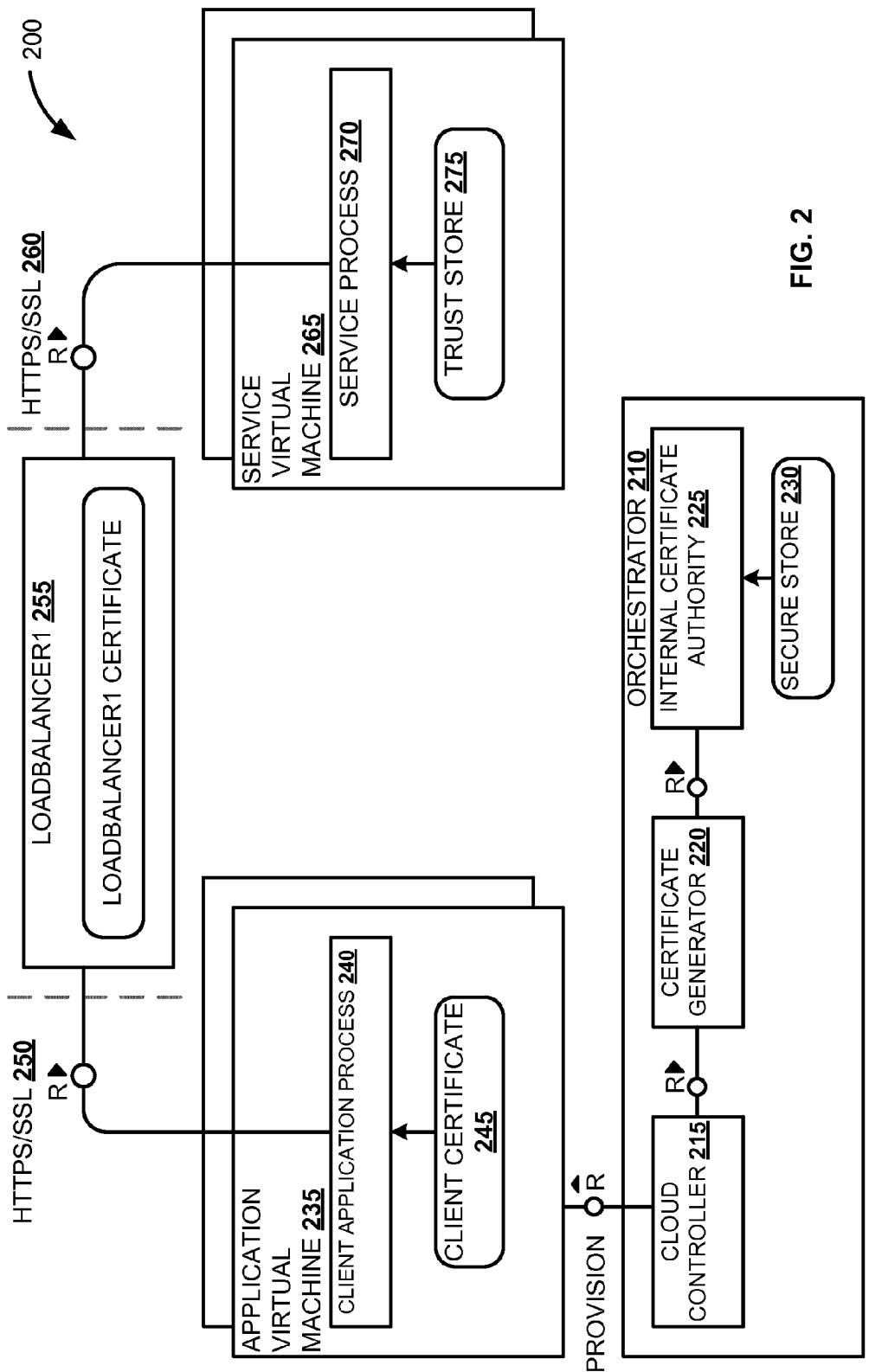
FIG. 2 is a block diagram illustrating a cloud platform architecture for secure communication between processes, according to one embodiment.

FIG. 2 is a block diagram illustrating cloud platform architecture 200 for secure communication between processes, according to one embodiment. Orchestrator 210 acts as a centralized cloud component in a virtualization environment that provisions application virtual machines and manages their lifecycle. Cloud controller 215 enables provisioning of the application virtual machines. Orchestrator 210 also maintains the runtime states of the provisioned application virtual machines.

When an application virtual machine is provisioned, certificate generator 220 of the orchestrator 210 creates a virtual machine certificate, also referred to as a client certificate, that may hold attribute information of the application virtual machine and application that is to be hosted and run on the application virtual machine. This client certificate may be signed and/or issued by a trusted certificate authority such as an internal certificate authority 225. In one embodiment, the internal certificate authority 225 itself may be a self-signed certificate. For an independent instance of cloud platform there is an internal certificate authority. The components of this instance of cloud platform can trust this internal certificate authority and the certificates issued by the internal certificate authority. The internal certificate authority 225 is available on the orchestrator 210. Secure store 230 stores the provisioned client certificates and other related information.

The cloud controller 215 provisions application virtual machine 235, which runs client application process 240. The certificate generator 220 of the orchestrator creates client certificate 245 that holds the attribute information associated with the application virtual machine 235 and the client application process 240 that is running on the application virtual machine 235. The application virtual machine 235 requests services from service virtual machine 265 via load balancer 255. By way of example, a secure communication channel can be established using secure sockets layer (SSL) protocol which provides communication security over the internet. Secure communication channel established from the application virtual machine 235 by using a uniform resource locator associated with a Hypertext Transfer Protocol Secure (HTTPS) and Secure Socket Layer protocol (SSL).

The application virtual machine 235 establishes a secure communication channel with a load balancer named 'loadbalancer1' 255 using HTTPS/SSL 250 communication channel. Because the secure communication channel is to be established via the load balancer, the secure communication channel HTTPS/SSL 250 from the application virtual machine 235 is terminated at the 'loadbalancer1' 255, and another secure communication channel HTTPS/SSL 260 is established from the 'loadbalancer1' 255 to the service virtual machine 265. The service processes of a service virtual machine may be registered at the 'loadbalancer1' 255. Accordingly the 'loadbalancer1' 255 may identify service process 270 executing in the service virtual machine 265, appropriate for fulfilling the request from the application virtual machine 235. In one embodiment, the service processes can be set up to allow multiple application virtual machines to access the services. The trust store 275 in the service virtual machine 265 stores service certificate associated with the service process 270. The service certificate may hold attribute information of the service virtual machine 265 and the service process 270 executing in the service virtual machine 265.

In one embodiment, database used in the cloud platform architecture to store data may be an in-memory database. In an in-memory database, memory organization may be linear. In a linear memory organization, data may be stored as a row store or a column store. In a row store, data is stored in a row sequentially, whereas in a column store, data is stored in a column, in contiguous memory locations.

Figure 3:
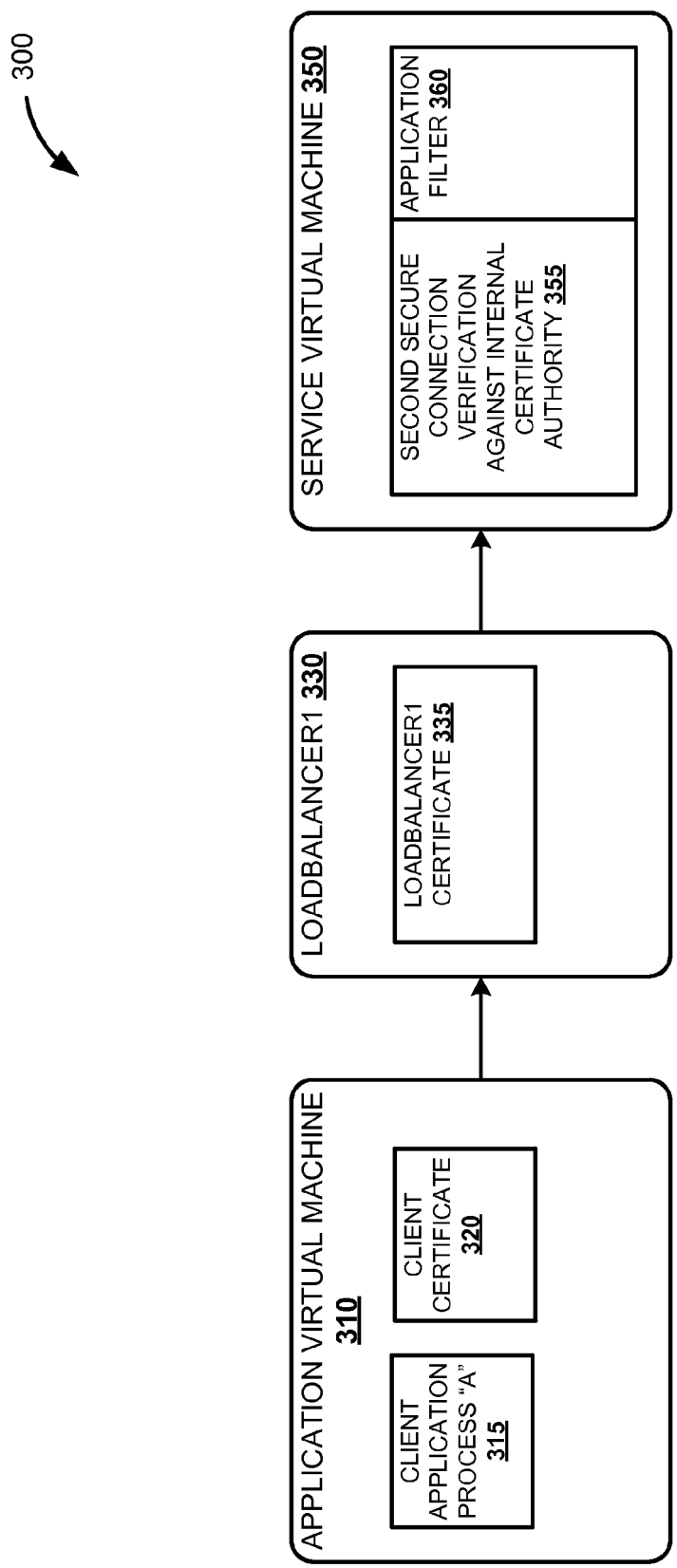
FIG. 3 is a block diagram illustrating secure communication between processes, according to one embodiment.

FIG. 3 is a block diagram illustrating secure communication between processes in cloud platform 300, according to one embodiment. In one embodiment, application virtual machine 310 is provisioned and runs client application process "A" 315. The application virtual machine 310 is identified by client certificate 320 signed by an internal certificate authority. By way of example, the client certificate 320 may be based on "X.509" standard for public key infrastructure. The client certificate 320 includes the application virtual machine 310 attributes and the client application process "A" attributes such as a host name, an account name, an application name, permission flags and tenant identifiers, etc. The client certificate 320 enables verifying the relation between the client certificate 320 and the application virtual machine 310.

The client application process "A" 315 running in the application virtual machine 310 requests a service process executing in the service virtual machines. Service processes executing in the service virtual machines may register with 'loadbalancer1' 330. 'Loadbalancer1' 330 identifies a service process executing in service virtual machine 350. The application virtual machine 310 may not be able or allowed to establish a direct communication channel with the service virtual machine 350. The communication channel can be established via the loadbalancerr 330.

The establishment of the secure communication channel and the authentication may occur in two phases. In first phase, the client application process "A" 315 running the application virtual machine 310 requests the 'loadbalancer1' 330 for establishing a first secure communication channel using HTTPS request. The first secure (HTTPS) communication channel may be encrypted using the client certificate 320. The loadbalancerr 330 trusts the internal certificate authority and can identify the application virtual machine 310 based on the client certificate 320 that is used in the HTTPS communication channel between the application virtual machine 310 and the loadbalancerr 330. This client certificate 320 may be transmitted to the service virtual machine 350, e.g., in an HTTPS request header. A first secure communication channel may be established between the client application process "A" 315 running in the application virtual machine 310 and the loadbalancerr 330. As the service processes executing in the service virtual machine 350 are registered at the 'loadbalancer1' 330, the loadbalancerr 330 identifies or discovers the service process appropriate for fulfilling the request from the application virtual machine 310. The first secure communication channel between the client application process "A" 315 running in the application virtual machine 310 and the 'loadbalancer1' 330 may be terminated.

In second phase, a new HTTPS request may be sent from the loadbalancerr 330 to establish a second secure connection between the loadbalancerr 330 and the service virtual machine 350 executing the identified service process. The loadbalancerr 330 tries to establish a second secure communication channel to the service virtual machine 350. The second secure connection from the 'loadbalancer1' 330 to the identified service process in the service virtual machine 350 is encrypted using load balancer certificate 335 signed by the internal certificate authority. The service process in the service virtual machine 350 may inspect the load balancer certificate 335, and verify whether the second secure connection is signed by the internal certificate authority 355. Based on the result, may accept connections that are received from the loadbalancerr 330 encrypted with the load balancer certificate 335 signed by the internal certificate authority.

The service process validates the load balancer certificate 335 to determine if it is signed by the internal certificate authority, and if the host name specified in the loadbalancerr certificate 335 is equal to the name of the loadbalancerr 330. Upon validation that the host name specified in the 'loadbalancer1' certificate 335 is equal to the name of the 'loadbalancer1' 330, the service process accepts the client certificate 320 from a new HTTPS request header. Application filter 360 may be installed on the service virtual machine 350 which enables a second level of validation of the identity of the application virtual machine 310. In this way, a dual authentication between (a) the client application process "A" 315 running in the application virtual machine client 310 and the 'loadbalancer1' 330, and (b) the 'loadbalancer1' 330 and the service process executing in the service virtual machine 350 is achieved.

Figure 4:
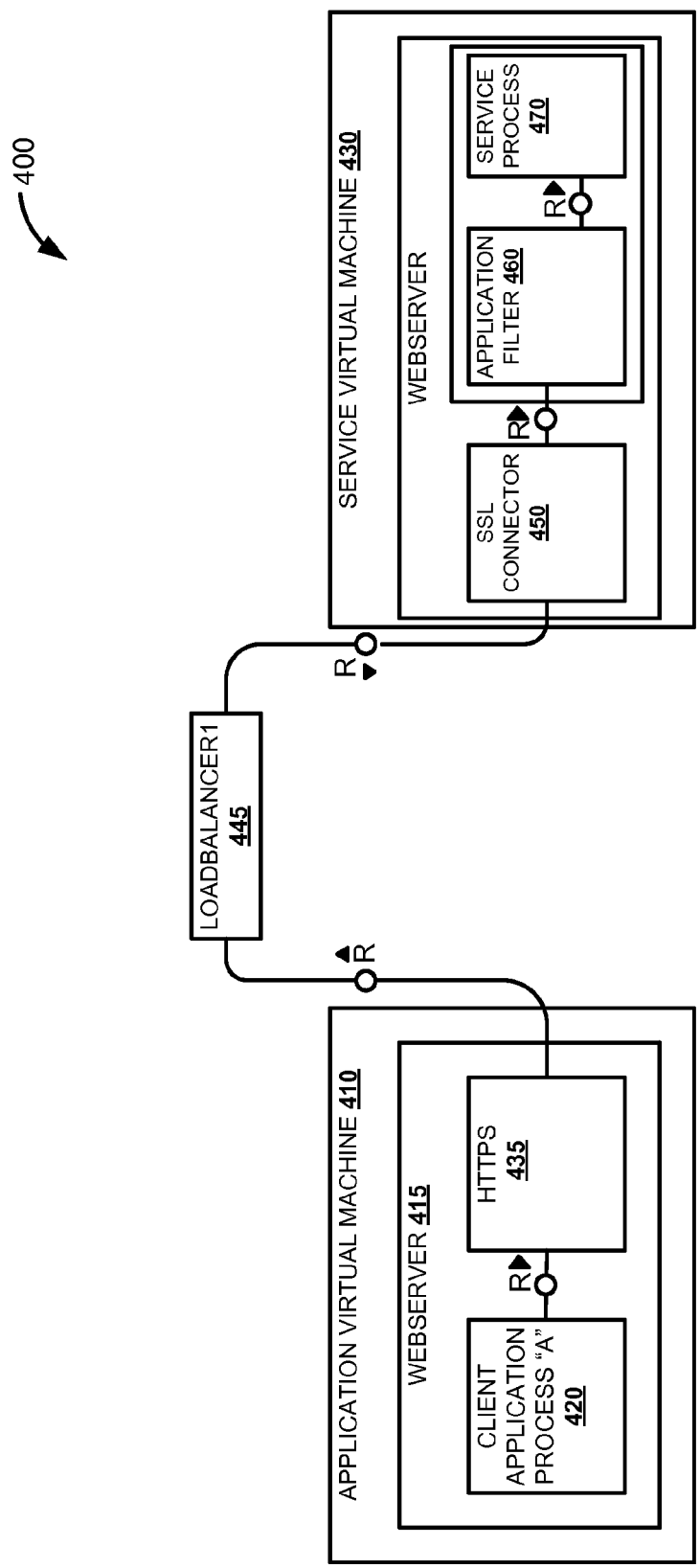
FIG. 4 is a block diagram illustrating the functionality of an application filter in the secure communication between processes, according to one embodiment.

FIG. 4 is a block diagram illustrating the functionality of application filter in secure communication between processes of cloud platform 400, according to one embodiment. Application virtual machine 410 is shown including web server 415 that delivers web services to a requesting entity. Client application process "A" 420 running in the application virtual machine 410 may request a service process executing in service virtual machine 430 using HTTPS 435. A first secure communication channel is established between the client application process "A" 420 running in the application virtual machine 410 and the loadbalancerr 445. A client certificate signed by an internal certificate authority associated with the application virtual machine 410 is sent to the service virtual machine 430 via an HTTPS request header.

A second secure communication channel is established between the loadbalancerr 445 and the service process executing in the service virtual machine 430 using a new HTTPS request. The new HTTPS request header holds the client certificate sent by the original HTTPS request. The second secure communication channel from the loadbalancerr 445 to the service process executing in the service virtual machine 430 is encrypted using a loadbalancerr certificate signed by the internal certificate authority. SSL connector 450 enables accepting the second secure communication channel from the loadbalancerr 445 at a preconfigured port. Service process 470 validates the loadbalancerr certificate, and upon successful validation accepts the second secure communication channel.

Application filter 460 performs a second level of validation. The application filter 460 reads the client certificate from the new HTTPS request header and based on the client certificate attributes authenticates accessing the service process 470. The client certificate may be validated to determine if it is signed by internal certificate authority. If the client certificate is not signed by the internal certificate authority, then it is inferred as an invalid certificate or missing certificate, accordingly the second secure communication channel is rejected. The client certificate is also validated to determine if the application virtual machine name specified in the new HTTPS request header is the same as the application virtual machine from which the HTTPS request was originally sent. If the application virtual machine name specified in the new HTTPS request header is not the same as the application virtual machine from which the HTTPS request was originally sent, then it is inferred as a counterfeit or stolen certificate.

Figure 5:
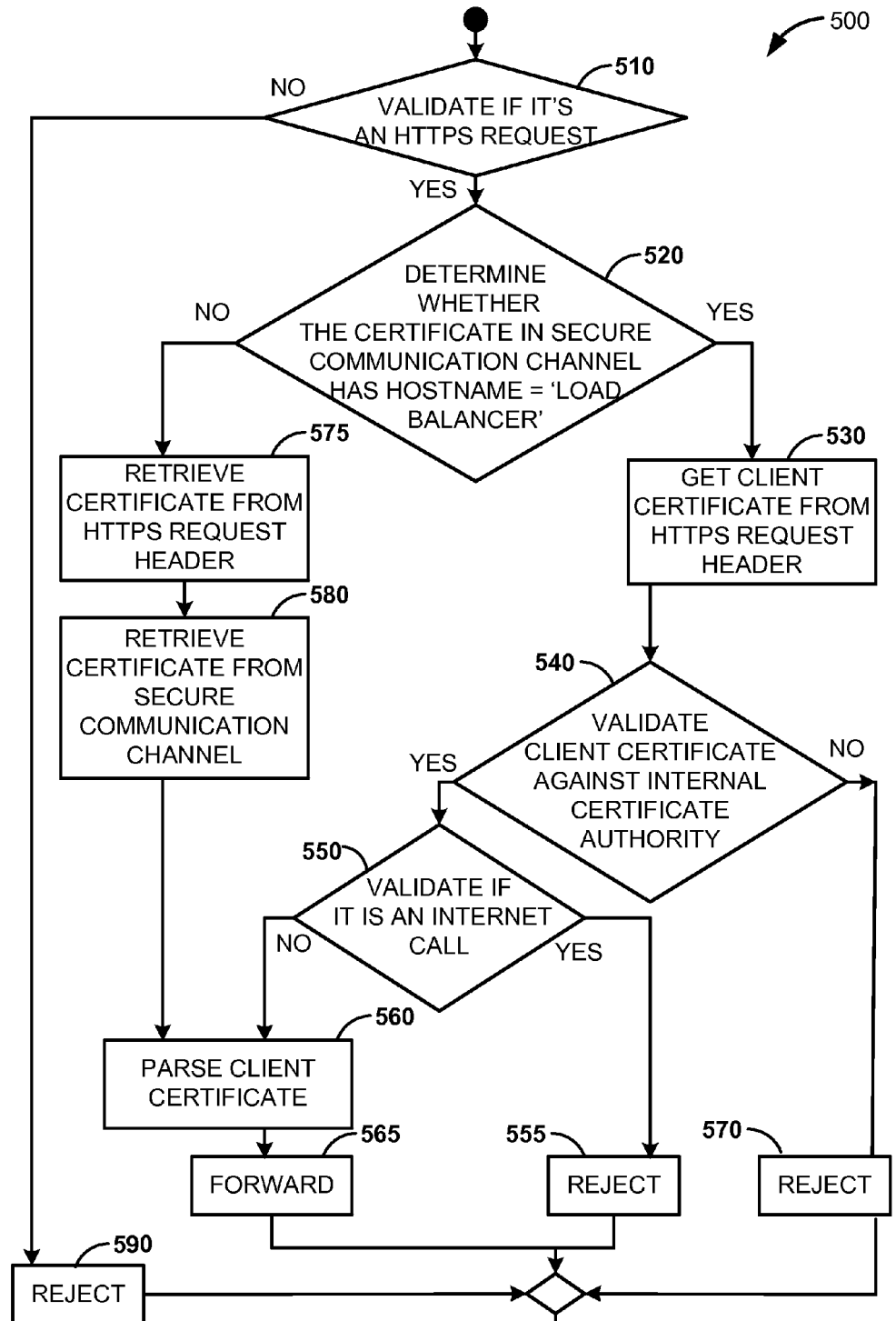
FIG. 5 is a flowchart illustrating the functionality of client certificate validation in the service virtual machine, according to one embodiment.

FIG. 5 is a flowchart illustrating process 500 of client certificate validation in service virtual machine, according to one embodiment. A secure communication channel is established between a load balancer and a service process of the service virtual machine. The secure communication channel from the load balancer to the service virtual machine is encrypted using the load balancer certificate signed by an internal certificate authority. An SSL connector at the service virtual machine enables establishing a secure connection with the load balancer, and a service process validates the load balancer certificate as discussed above in reference to FIG. 4.

At 510, it is validated whether the request from the application virtual machine is a secure request such as a HTTPS request. Upon validation that the request is a non-secure request, the request is rejected at 590. Upon validation that the request is a secure request, at 520 it is determined whether the certificate in the secure communication channel has the host name of the load balancer. Upon determining that the certificate in the secure communication channel has the host name of the load balancer, at 530, a client certificate is retrieved from an HTTPS request header. At 540, it is validated whether the client certificate is signed by an internal certificate authority. Upon validating that the client certificate is not signed by the internal certificate authority, at 570, the HTTPS request is rejected.

Upon validating that the client certificate is signed by the internal certificate authority, at 550, it is validated whether the HTTPS request originated from the application virtual machine in the cloud platform, or an internet call originated from some client outside the established cloud platform. Upon validation that the HTTPS request originated from the application virtual machine in the cloud platform, at 560, parse the client certificate, and at 565, forward the HTTPS request to access the service process or to other underlying applications as appropriate. This validation may preprocess the HTTPS request before accessing the underlying applications as appropriate. Upon validation that the HTTPS request is an internet call originated from some client outside the established cloud platform, at 555, the HTTPS request is rejected.

Upon determining that the certificate in the secure communication channel does not have the host name of the load balancer, it is inferred that the secure communication channel is not initiated by the load balancer but by some other client. In this scenario the certificate in the HTTPS header is not trusted and the certificate used to encrypt the secure communication channel may be retrieved and used. Accordingly, at 575, the certificate from the HTTPS request header is retrieved and removed, and at 580, the certificate used to encrypt the secure communication channel is retrieved. The retrieved certificate is parsed at 560 and forwarded at 565 to appropriate authentication software programs which implements authentication modules.

Figure 6:
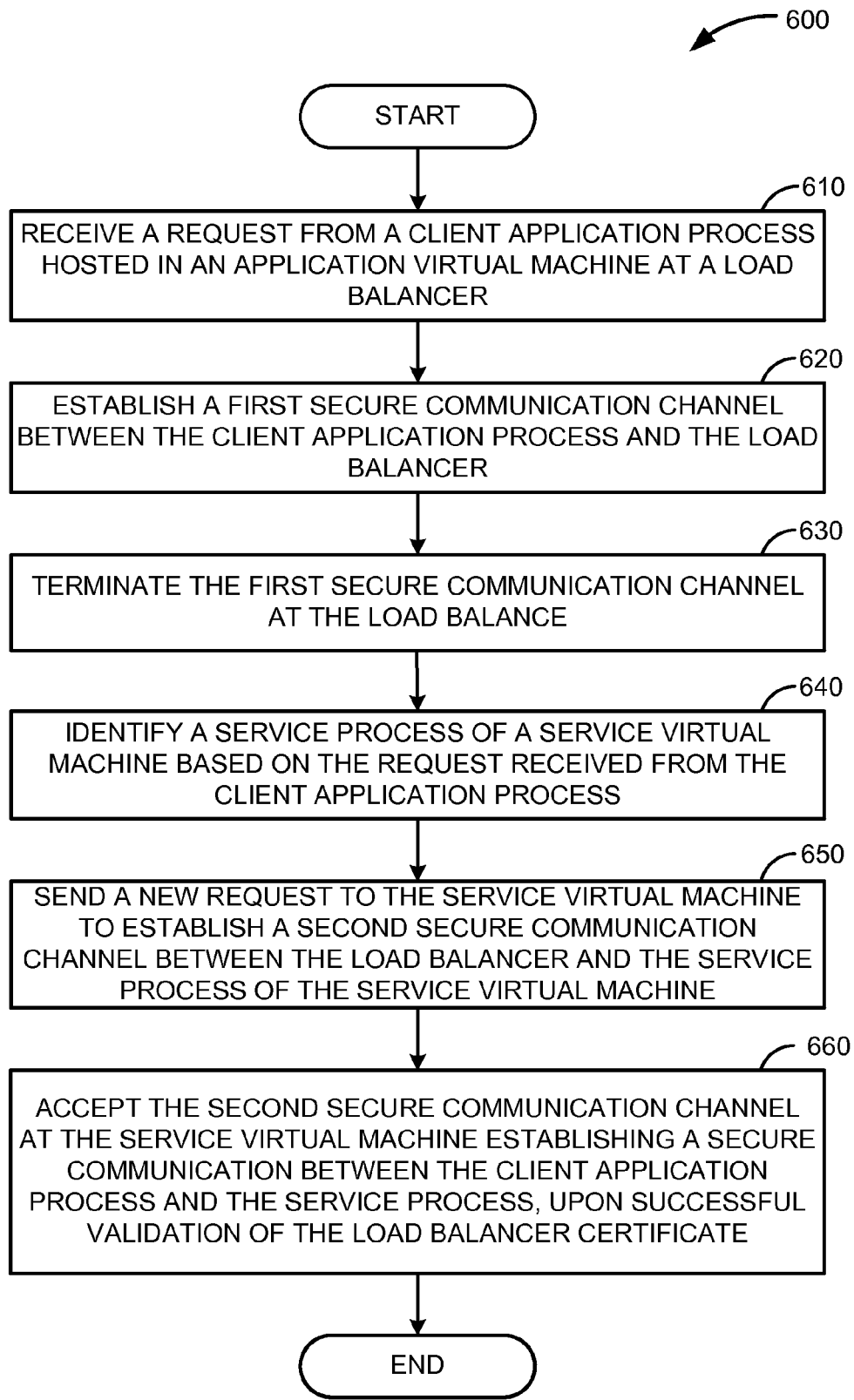
FIG. 6 illustrates a flow diagram of a process of secure communication between processes in cloud, according to one embodiment.

FIG. 6 illustrates a flow diagram of process 600 of secure communication between processes in cloud, according to one embodiment. At 610, a request from a client application process hosted in an application virtual machine is received at a load balancer. At 620, a first secure communication channel is established between the client application process and the load balancer. The first secure communication channel is encrypted with a client certificate. The request may include a request header with the client certificate of the client application process. At 630, the first secure communication channel is terminated at the load balancer.

At 640, a service process of a service virtual machine is identified based on the request received from the client application process. At 650, a new request is sent from the load balancer to the service virtual machine to establish a second secure communication channel between the load balancer and the service process of the service virtual machine. The second secure communication channel is encrypted with a load balancer certificate signed by an internal certificate authority. At step 660, upon successful validation of the load balancer certificate, the second secure communication channel is accepted at the service virtual machine establishing a secure communication between the client application process and the service process.

The various embodiments described above have a number of advantages. The application virtual machine establishes secure connection to the service virtual machine via the load balancer. The secure connection is established in two phases using certificates signed by internal certificate authority. Secure connection is ensured with valid certificates signed by internal certificate authority. Connections from hosts holding a certificate not signed by internal certificate authority is rejected, thereby ensuring security. The complexity of dual authentication between the application virtual machine and the load balancer, and the load balancer and the service virtual machine is reduced, thereby ensuring efficient dual authentication.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
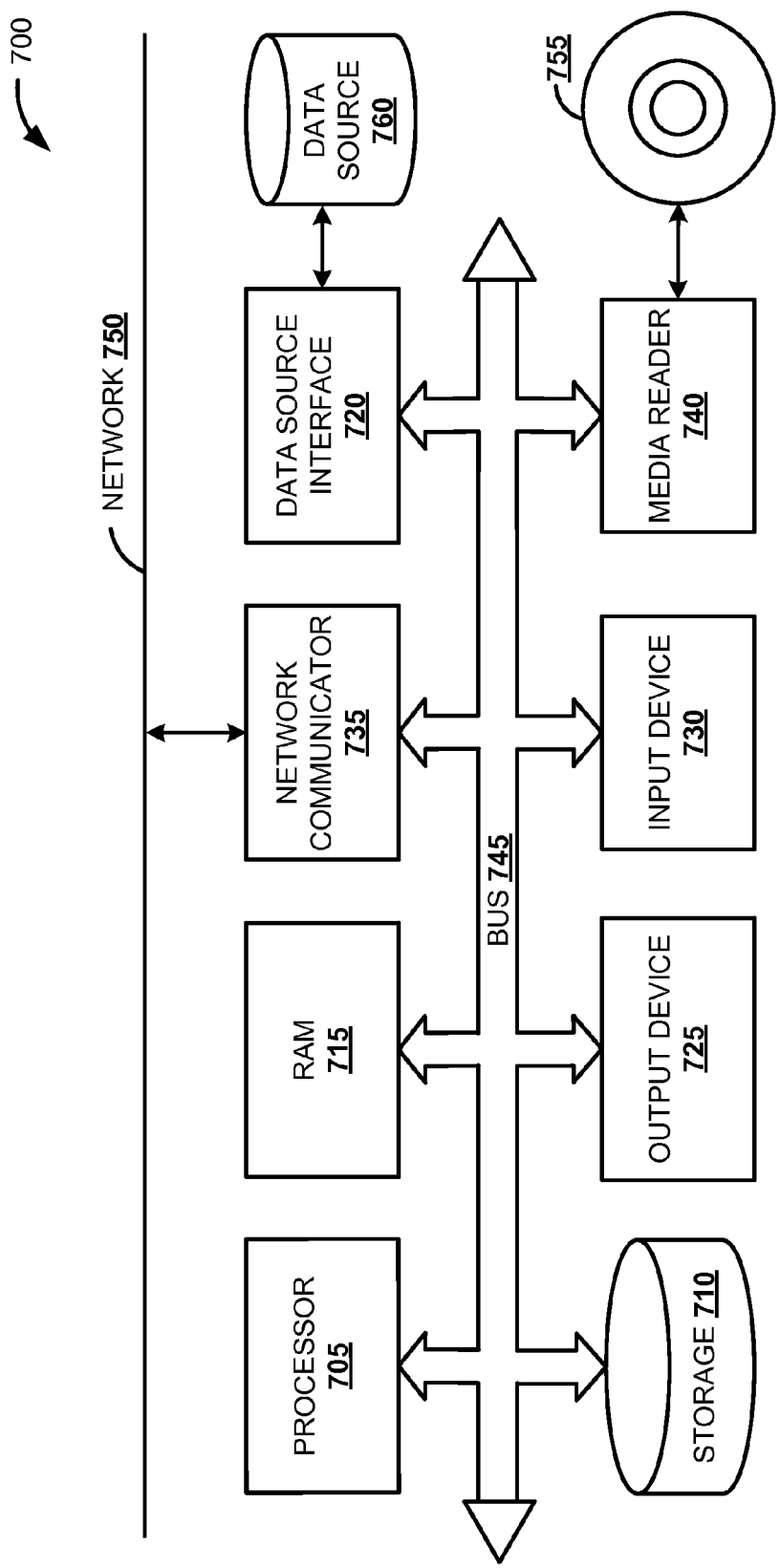
FIG. 7 is a block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receiving a request from a client application process hosted in an application virtual machine at a load balancer, wherein the request comprises a client certificate;
   establishing a first secure communication channel between the client application process and the load balancer, wherein the first secure communication channel is encrypted with the client certificate;
   terminating the first secure communication channel at the load balancer; identify a service process of a service virtual machine based on the request received from the client application process;
   sending a new request to the service virtual machine to establish a second secure communication channel between the load balancer and the service process of the service virtual machine, wherein the second secure communication channel is encrypted with a load balancer certificate signed by a certificate authority; and
   accepting the second secure communication channel at the service virtual machine establishing a secure communication between the client application process and the service process, upon successful validation of the load balancer certificate.

2. The computer-readable medium of claim 1, to store instructions, which when executed by the computer, cause the computer to perform operations further comprising:
   retrieving the client certificate from the request at the service virtual machine;
   validating the client certificate at an application filter installed at the service virtual machine; and
   establishing the second secure communication channel between the load balancer and the service virtual machine, upon successful validation of the client certificate.

3. The computer-readable medium of claim 2, wherein the client certificate comprises attribute information including at least one of a host name, an account name, an application name, permission flags and a tenant identifier.

4. The computer-readable medium of claim 3, wherein validation of the client certificate is based on the certificate attributes.

5. The computer-readable medium of claim 3, to store instructions, which when executed by the computer, cause the computer to perform operations further comprising:
   validating by matching the host name in the attribute information with a host name associated with the request.

6. The computer-readable medium of claim 1, to store instructions, which when executed by the computer, cause the computer to perform operations further comprising:
   validating the load balancer certificate signed by the certificate authority at the service virtual machine.

7. The computer-readable medium of claim 1, wherein the client certificate associated with the application virtual machine is provisioned by an orchestrator while provisioning the application virtual machine.

8. A computer-implemented method for secure communication between processes, the method comprising:
   receiving a request from a client application process hosted in an application virtual machine at a load balancer, wherein the request comprises a client certificate;
   establishing a first secure communication channel between the client application process and the load balancer, wherein the first secure communication channel is encrypted with the client certificate;
   terminating the first secure communication channel at the load balancer;
   identifying a service process of a service virtual machine based on the request received from the client application process;
   sending a new request to the service virtual machine to establish a second secure communication channel between the load balancer and the service process of the service virtual machine, wherein the second secure communication channel is encrypted with a load balancer certificate signed by a certificate authority;
   validating the load balancer certificate signed by the certificate authority at the service virtual machine; and
   accepting the second secure communication channel at the service virtual machine establishing a secure communication between the client application process and the service process, upon successful validation of the load balancer certificate.

9. The method of claim 8, further comprising:
retrieving the client certificate from the request at the service virtual machine; and
validating the client certificate at an application filter installed at the service virtual machine; and
establishing the second secure communication channel between the load balancer and the service virtual machine, upon successful validation of the client certificate.

10. The method of claim 9, wherein the client certificate comprises attribute information including at least one of a host name, an account name, an application name, permission flags and a tenant identifier.

11. The method of claim 10, wherein validation of the client certificate is based on the certificate attributes.

12. The method of claim 10, further comprising:
validating by matching the host name in the attribute information with a host name associated with the request.

13. The method of claim 8, further comprising:
validating the load balancer certificate signed by the certificate authority at the service virtual machine.

14. The method of claim 8, wherein the client certificate associated with the application virtual machine is provisioned by an orchestrator while provisioning the application virtual machine.

15. A computer system for secure communication between processes, comprising:
a computer memory to store program code; and
a processor to execute the program code to:
receive a request from a client application process hosted in an application virtual machine at a load balancer, wherein the request comprises a client certificate;
establish a first secure communication channel between the client application process and the load balancer, wherein the first secure communication channel is encrypted with the client certificate;
terminate the first secure communication channel at the load balancer;
identify a service process of a service virtual machine based on the request received from the client application process;
send a new request to the service virtual machine to establish a second secure communication channel between the load balancer and the service process of the service virtual machine, wherein the second secure communication channel is encrypted with a load balancer certificate signed by a certificate authority; and
accept the second secure communication channel at the service virtual machine establishing a secure communication between the client application process and the service process, upon successful validation of the load balancer certificate.

16. The system of claim 15, wherein the processor further executes the program code to:
retrieve the client certificate from the request at the service virtual machine; and
validate the client certificate at an application filter installed at the service virtual machine; and
establish the second secure communication channel between the load balancer and the service virtual machine, upon successful validation of the client certificate.

17. The system of claim 16, wherein the client certificate comprises attribute information including at least one of a host name, an account name, an application name, permission flags and a tenant identifier.

18. The system of claim 16, wherein validation of the client certificate is based on the certificate attributes.

19. The system of claim 17, wherein the processor further executes the program code to:
validate by matching the host name in the attribute information with a host name associated with the request; and
validate the load balancer certificate signed by the certificate authority at the service virtual machine.

20. The system of claim 15, wherein the client certificate associated with the application virtual machine is provisioned by an orchestrator while provisioning the application virtual machine.

* * * * *